United States Patent [19]
Bohm

[11] 3,853,631
[45] Dec. 10, 1974

[54] METHOD FOR INCREASING ACTIVITY OF CARBON ELECTRODES FOR ELECTROCHEMICAL CELLS WITH ACID ELECTROLYTE AND PRODUCT THEREOF

[75] Inventor: Harold Bohm, Glashutten, Germany

[73] Assignee: Licentia Patent Verwaltungs GmbH, Frankfurt, Germany

[22] Filed: Jan. 22, 1973

[21] Appl. No.: 325,636

[30] Foreign Application Priority Data
Jan. 21, 1972 Germany............................ 2202898

[52] U.S. Cl. ................................................ 136/121
[51] Int. Cl. ........................................... H01m 13/02
[58] Field of Search................... 136/121, 122, 120; 252/411 R, 447

[56] References Cited
UNITED STATES PATENTS

| | | | |
|---|---|---|---|
| 2,669,598 | 2/1954 | Marko et al. ....................... | 136/122 |
| 3,196,050 | 7/1965 | Thompson .......................... | 136/122 |
| 3,287,172 | 11/1966 | Shropshire et al. .............. | 136/121 X |
| 3,346,421 | 10/1967 | Thompson et al. ............... | 136/121 X |
| 3,477,877 | 11/1969 | Kordesch .......................... | 136/121 X |
| 3,488,225 | 1/1970 | Selkel et al. ...................... | 136/121 X |
| 3,553,029 | 1/1971 | Kordesch et al. ................. | 136/121 X |
| 3,578,505 | 5/1971 | Rogers et al. ..................... | 136/121 X |

Primary Examiner—Winston A. Douglas
Assistant Examiner—C. F. LeFevour
Attorney, Agent, or Firm—Spencer & Kaye

[57] ABSTRACT

An oxygen electrode with activated carbon as the catalyst material for electrochemical cells with an acid electrolyte, wherein the carbon is doped with a metal salt prior to being treated with an activation gas.

6 Claims, 1 Drawing Figure

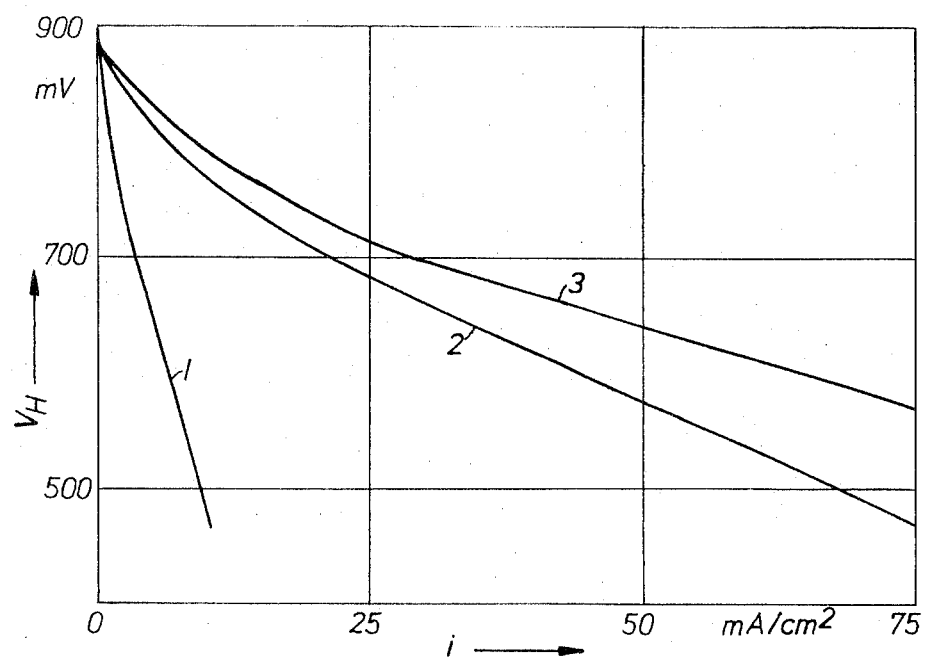

METHOD FOR INCREASING ACTIVITY OF CARBON ELECTRODES FOR ELECTROCHEMICAL CELLS WITH ACID ELECTROLYTE AND PRODUCT THEREOF

BACKGROUND OF THE INVENTION

In an acid type fuel cell oxygen is reduced at the cathode. The electrode material may be noble metals which, however, are so expensive that the use of such noble metal electrodes is not practicable from the economic viewpoint. It has been proposed to use for the oxygen electrode cheaper substances including base metal catalysts and organic complex compounds such as, for example, phthalocyanines, porphyrines and tetrazo annulenes. With these classes of materials, however, stability is insufficient to assure use in a fuel cell with an acid electrolyte over very long periods of time, more particularly for service in the order of 30,000 to 40,000 hours which is desired in practical applications.

Up to the present, the only non noble metal substance which has proven satisfactory for this purpose in such cells is carbon. Carbon, moreover, is cheap and lightweight, thus offering the further advantages of a favorable specific weight and relatively low material cost.

Unfortunately, the available active carbon has relatively low catalytic activity in the state in which it is obtained and it is necessary to subject it to various further activation procedures wherein it is treated with air, oxygen, hydrogen, carbon dioxide or ammonia at temperatures in the order of 800° – 1,000°C. Under these conditions, reactions between the gases and the carbon result in a substantial increase in the surface of the carbon per unit weight along with incorporation thereon of various reaction product, for example nitrogen-containing groups, if the activation is made with ammonia. The resulting increase in activity is substantially higher than can be attributed to the gain in surface area alone (Wissenschaftliche Berichte AEG-Telefunken [Scientific Reports by AEG-Telefunken], 43, 1970, volume 3/4, pages 241–245).

The current densities obtained with such carbon electrodes are not sufficient, however, when such an electrode is used with, for example, a tungsten carbide electrode in a fuel cell with an acid electrolyte, as the carbon electrode limits the attainable output of these fuel cells (Wissenschaftliche Berichte AEG-Telefunken [Scientific Reports by AEG-Telefunken], 43, 1970, volume 3/4, pages 241–245).

SUMMARY OF THE INVENTION

It is the object of this invention to improve the catalytic activity of a carbon electrode over that obtainable when treated according to one of the conventional activation processes. This is accomplished by doping the carbon with a metal salt during the activation process preceeding treatment with the activating gas.

BRIEF DESCRIPTION OF THE DRAWING

The figure is a graph of polarization voltage vs current density for an electrode formed of untreated active carbon (curve 1), of active carbon which has been further activated by only ammonia (curve 2), and of active carbon which has been activated according to the invention (curve 3).

DETAILED DESCRIPTION OF THE INVENTION

The carbon to be activated is comminuted, if necessary, and is doped by suspension in a relatively weak solution of a selected metal salt. In this way the metal salt is adsorbed in the carbon particles and becomes affixed thereon during the subsequent drying and activating steps.

The carbon with adsorbed metal salt is separated from the solution and dried in a rotary evaporator or in any other suitable manner. The dried pretreated carbon is then heated to a relatively high temperature (800° – 1,000°C), preferably while in a protective atmosphere of an inert gas such as argon, helium and the like. The heated pretreated carbon is then subjected to an atmosphere of the activating gas in the conventional manner. This latter treatment in the activating gas atmosphere generally lasts for approximately 30 minutes. The thus twice activated carbon is then cooled, again preferably in an atmosphere of inert protective gas.

The heating of the carbon in the inert gas atmosphere and in the activating gas atmosphere, and the subsequent cooling are preferably done in a moving bed system of conventional design. (Winnacker-Kuchler: "Chemische Technologie," volume 2, Anorganische Technologie II, Carl Hanser Verlag, Munchen, 1970, page 28).

After cooling the thus activated carbon may be directly formed, for example, by pressing, into the desired electrodes, with the addition as a binder of a thermoplastic synthetic polymer material such as polytetrafluoro ethylene or polyethyelene. The resulting gas diffusion electrode may be directly inserted into fuel cells with acid electrolytes.

The metal salt employed may be a soluble salt such as a nitrate of manganese, iron, cobalt, nickel, copper or silver, or ammonium compounds such as ammonium vanadate, ammonium niobate, ammonium molybdate or ammonium tungstenate, or a tantalum fluoride. The concentration of the metal compound in the treating solution preferably lies between about 1/100 and 5 percent by weight.

The following examples are illustrative of the invention:

EXAMPLE 1

About 200g of active carbon are suspended in one liter of an approximately 1% aqueous metal salt solution, for example, 1–10g of cobalt nitrate, $Co(NO_3)_2$, per liter of water, $H_2O$. The water is subsequently removed in a vacuum in a rotating evaporator at 60° to 70°C. The carbon/metal salt mixture (50g) is then heated to 900°C in a moving bed apparatus in the presence of argon (about 5 liters per hour). Upon reaching of the desired temperature the argon is replaced by $NH_3$ for 30 minutes at a flow speed of 10 to 15 liters per hour in the moving bed apparatus (diameter 50 mm). Upon completion of the process the catalyst is cooled to room temperature in an argon atmosphere.

EXAMPLE 2

About 100 g of active carbon are suspended in a solution of 10 g ammonium paramolybdate in one liter of water. After adsorption of the molybdate the active carbon is filtered and then dried at 120 °C. The doped carbon is heated in a moving bed apparatus to 950 °C in a 96 % argon/4 % hydrogen atmosphere. Reaching the desired temperature the gas is changed to ammonia for 30 minutes (flow speed about 15 liters per hour). After finishing the activation process the carbon catalyst is cooled to room temperature in an argon atomosphere.

200 g of active carbon is suspended in a solution of 20 g iron nitrate in 2 liters of water. The water is then evaporated in a vacuum in a rotating evaporator at about 70° to 80 °C. The so dried carbon powder is heated in an argon atmosphere up to 900 °C. After reaching this temperature the argon stream is lead through a gas-wash bottle with water of a temperature of 50 °C and after saturation with water vapor the gas streams over the doped carbon powder at 900 °C with a flow speed of 15 liters per hour in the moving bed apparatus.

This procedure is stopped after 30 minutes and the carbon is cooled to room temperature in an argon atmosphere. After this activation process with water vapor the carbon powder is manufactured to gas diffusion electrodes.

EXAMPLE 3

In a similar manner, the carbon powder may be alternatively treated, prior to heating and contacting with the activating gas, with any of the other of the above mentioned metal compounds in a suitable solution or suspension is an appropriate liquid carrier, such as water, ethyl alcohol, diethyl ether, or methylethyl ketone.

Upon pressing the thus activated carbon material with a binder of thermoplastic synthetic polymer to form gas diffusion electrodes in a known manner, these electrodes may be used immediately in electrochemical cells without requiring further treatment.

The use of a metal salt during the manufacturing process results in a further increase of the activity of the carbon for the reduction of $O_2$, as can be seen in the accompanying figure. This figure presents several current-voltage curves, of which curve 1 represents the active carbon in the state in which it is delivered curve 2 being obtained from carbon activated with $NH_3$ according to the prior art, and curve 3 being obtained from an active carbon which has been activated with a metal salt and with $NH_3$ in accordance with the invention. The polarization curves are obtained at gas diffusion electrodes in a well-known half cell assembly. For the untreated active carbon there results, at a polarization voltage of about 600 mV, a current density of about 10 mA/cm$^2$ (curve 1), while the current density of an active carbon which has been activated only with $NH_3$, at the same polarization voltage, is about 50 mA/cm$^2$ (curve 2). For an active carbon activated with a metal salt and $NH_3$ a substantially increased current density of 75 mA/cm$^2$ is obtained at the same polarization voltage (curve 3).

The invention thus makes possible a very substantial increase in the catalytic activity of the oxygen electrode. Where the activation is carried out in a moving bed device, the resulting product is very uniform and the activation rate is increased with greater throughputs.

It will be understood that the above description of the present invention is susceptible to various modifications, changes and adaptations, and the same are intended to be comprehended within the meaning and range of equivalents of the appended claims.

I claim:

1. In a method for producing an activated carbon oxygen electrode for electrochemical cells with acid electrolytes, wherein carbon powder is activated by treatment with a reactant gas prior to being formed into the electrode, the improvement which comprises: forming a mixture of carbon powder and a catalytic metal salt by mixing the carbon powder with a solution of the metal salt; activating said mixture with an inert gas at a temperature between 800° and 1,000°C; and thereafter further activating the mixture at a temperature between 800° and 1,000°C with ammonia or a mixture of ammonia and inert gas.

2. The method as defined in claim 1 wherein the metal salt is selected from the group consisting of the nitrates of manganese, iron, cobalt, nickel, copper and silver, ammonium vanadate, ammonium niobate, ammonium molybdate, ammonium tungstenate and tantalum fluoride.

3. The method as defined in claim 2 wherein the activation is carried out in a moving bed.

4. The method as defined in claim 2 wherein the carbon powder is suspended in a relatively weak solution of the metal salt, and the solution is subsequently heated to evaporate the liquid in it.

5. An activated carbon oxygen electrode for electrochemical cells with acid electrolytes produced according to the process of claim 1.

6. An activated carbon electrode for electrochemical cells with acid electrolytes produced according to the method of claim 2.

* * * * *